March 22, 1938.  J. LEITCH  2,112,169

JACK MOUNTING ARRANGEMENT

Filed June 14, 1937   2 Sheets-Sheet 1

INVENTOR.
John Leitch
BY
Gerald J Baldwin
ATTORNEY.

INVENTOR.
John Leitch
BY
Gerald F. Baldwin
ATTORNEY.

Patented Mar. 22, 1938

2,112,169

UNITED STATES PATENT OFFICE 2,112,169

JACK MOUNTING ARRANGEMENT

John Leitch, Detroit, Mich., assignor of one-half to Anthony Nelson, Detroit, Mich.

Application June 14, 1937, Serial No. 148,145

10 Claims. (Cl. 254—133)

This invention relates to improvements in jack mounting arrangements. It is an object of the invention to provide a simple and cheap form of jack mounting arrangement which may be permanently arranged partly upon the sprung portion and partly upon the unsprung portion of a vehicle, and upon which a jack may be readily secured adjacent one bumper for sliding movement into correct wheel lifting position.

Another object of the invention is to provide a jack mounting arrangement having a guide rod upon which the jack slides into position, and through which the lift is transmitted to the wheel.

A further object of the invention is to provide such a jack mounting arrangement wherein the guide rod is held by spring means to prevent the said guide rattling, to hold it substantially rigid during movement of the jack along it; and to permit independent movement of the sprung or unsprung portion of the vehicle, by both of which the said guide rod is supported.

Having thus briefly and broadly stated some of the major objects and advantages of the invention, I will now proceed to describe the construction with the aid of the accompanying drawings, in which.

Figure 1:
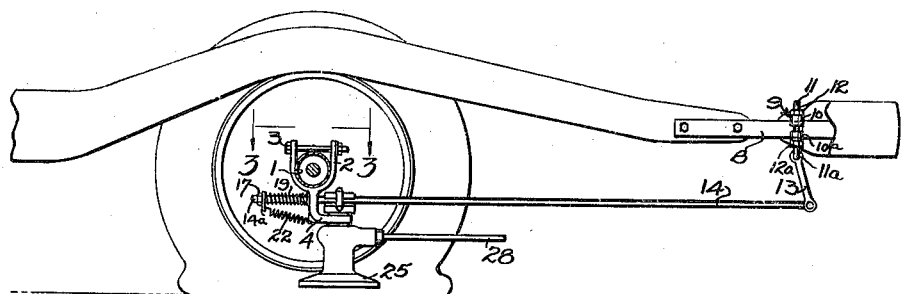
Figure 1 illustrates a longitudinal view of the invention applied to one rear wheel of a vehicle.
Figure 3:
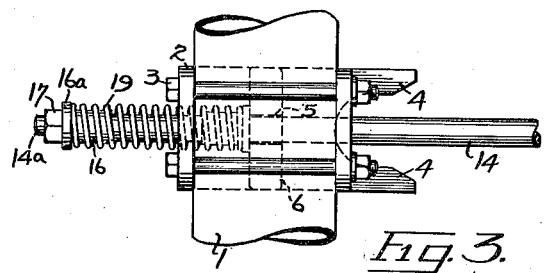
Figure 3 is an enlarged partial plan view taken on the line 3—3 of Figure 1.

Referring to Figures 1 to 4 of the drawings, 1 denotes a rear axle of an automobile around which a clamping member 2 is secured as by a bolt 3. Formed integral with the member 2 and extending horizontally and rearwardly beneath it is a yoke 4; 5 denotes an aperture formed horizontally through a neck 6 by which, in the present instance, the yoke 4 is connected to the said member 2. The said neck is positioned immediately beneath the axle 1 so that upward pressure exerted upon it and upon the clamping member 2, in a manner hereinafter described, exerts upward pressure centrally of the axle 1. Formed in the upper portion of the wall of the aperture 5 is a transversely arranged downwardly projecting tooth 7.

Mounted upon a sprung portion of the vehicle, in the present instance upon one of the bumper supports 8 is a bracket 9 consisting of two jaws 10 and 10a connected by a vertical stud 11 having a horizontally flexed lower extremity 11a. Nuts 12 and 12a upon the studs 11 hold the jaws 10 and 10a in gripping engagement with the upper and lower margins of the bumper support 8. Pivoted upon the flexed extremity 11a of the stud is a link 13 the opposite end of which pivotally supports the outer extremity of a guide rod 14, which may be of any form of cross section, though in the present case it is shown round. This guide rod, intermediately of its length, extends through the aperture 5 the height of which is somewhat greater than that of the rod 14 to permit free movement of the latter beneath the tooth 7. Formed in the upper face of the rod 14 are a plurality of transverse serrations 15 any one of which is adapted to be engaged by the tooth 7.

Upon the reduced inner extremity 14a of the rod 14 a sleeve 16 having a flange 16a around its outer extremity is provided which is held in position by a nut 17; and around the said rod a second sleeve 18 is also provided having a flange 18a at one extremity which rests against the inner face of the neck 6. Extending between the flanges 16a and 18a, and around the rod 14, is a helical spring 19 which tends to move the said rod in the direction of the arrow A. Formed in the flange 16a is an eye 20, and connected at one extremity to the latter is a second spring 22 the opposite end of which is hooked into an opening 21 formed in the yoke 4. This second spring 22 tends to move the rod 14 in the direction of the arrow B. The two springs 19 and 22 tend to retain the rod in the position shown. They prevent rattling of the device when the vehicle is in motion; hold the rod 14 substantially still against axial movement when the jack is being moved along it in the manner hereinafter described; and permit the rod to move axially in either direction in the event of independent movement of either the sprung or unsprung portion of the vehicle. If such movement occurs it will also be noted that the lower surface of the aperture 5 is made longitudinally concave as clearly shown at 5a in Figure 2, consequently the rod 14 may rock therein as the link 13 swings somewhat about its pivot axis, the flexed stud extremity 11a.

Figure 2:
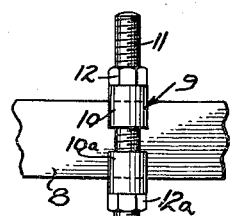
Figure 2 is an enlarged longitudinal view thereof.
Figure 2:
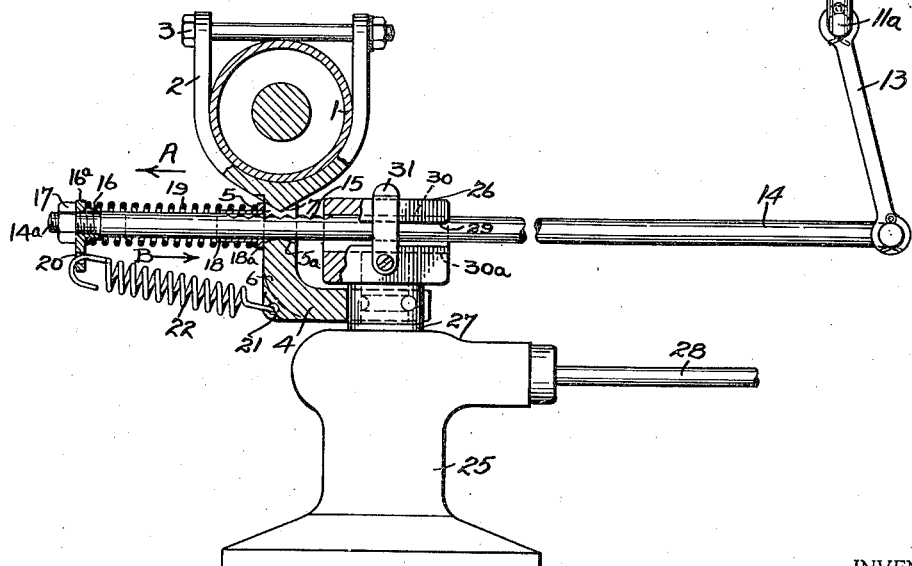

The jack 25 is provided with a vertically movable head 26 immediately beneath which a shank 27 is provided, both of which are adapted to be raised and lowered in the conventional manner by the actuation of any preferred type of mechanism through movement of the jack handle 28. A horizontal slot 29 is formed in one side of the head 26, and is provided with upwardly and downwardly projecting recesses 30 and 30a respectively adjacent its inner extremity. These recesses extend throughout the length of the head 26, and either of them is intended to form a seat for the rod 14, as may be clearly seen in Figure 7. The upper recess 30 receives the said rod when the jack is suspended thereon as shown in Figures 1 and 2 for movement of the latter into or from its lifting position shown; and the lower recess 30a receives the said rod when the jack head is raised and the axle 1 is being lifted through the rod 14 and clamping member 2. The rearwardly projecting bifurcations of the yoke 4 receive the shank 27 as the jack is moved forward along the rod 14 and halt its movement when the jack has reached its proper lifting position. A lock 31 pivoted upon the side of the head 26 normally extends across the slot 29 and prevents accidental disengagement of the jack from the rod. The lock is preferably retained in its slot closing position by spring means. In the present instance the said lock, which is resilient, is flexed adjacent its outer extremity so that to move it pivotally its extremity must be outwardly flexed to turn against the vertical face of the head 26.

The operation of the device is briefly as follows: The jack 25 is placed upon the rod 14 near the bumper 32 and pushed forward through the handle 28 until the shank 27 is engaged by the yoke 4. The jack is then raised by manipulation of the handle in the ordinary manner. As the jack head 26 is raised the rod 14 is lifted and one of its serrations 15 is engaged by the tooth 7. Axial movement of the rod 14 through the clamping member 2 is then prevented. Further lifting of the rod 14 causes upward movement of the said member 2 and the axle 1.

Figure 5:
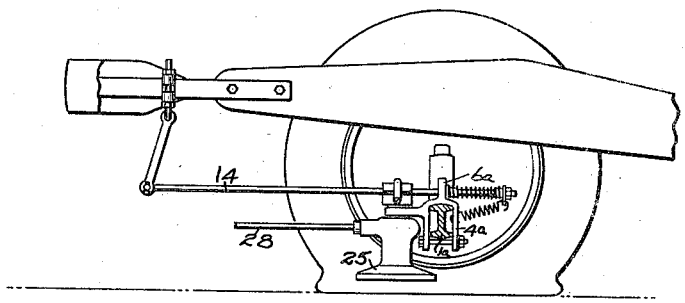
Figure 5 is a longitudinal view showing the invention applied to a front wheel of a vehicle.
Figure 4:
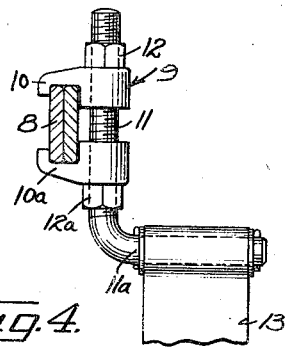
Figure 4 is an enlarged side view showing the bracket upon a bumper support by which the link is held.
Figure 7:
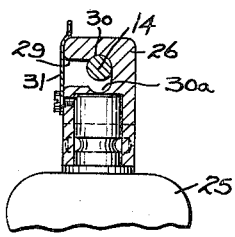
Figure 7 is a section on the line 7—7 of Figure 6.
Figure 6:
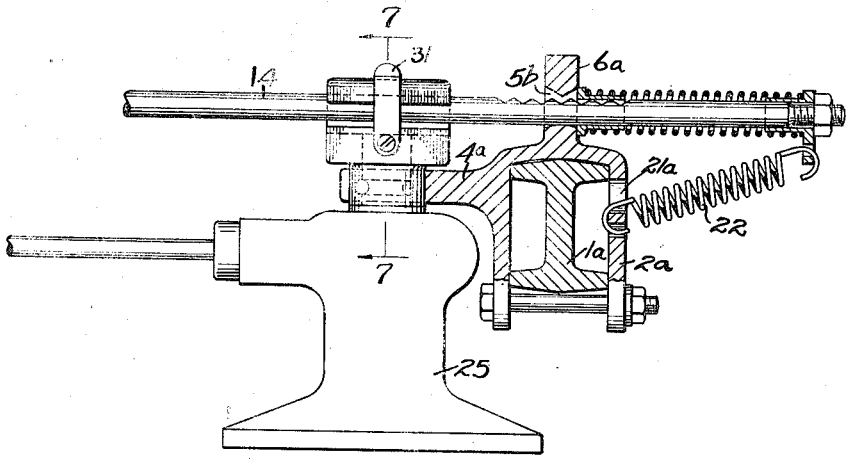
Figure 6 is an enlarged view of a portion thereof.

In the modification shown in Figures 5, 6 and 7, a somewhat differently formed clamping member 2a is provided around the front axle 1a. The yoke 4a projects horizontally from the member 2a, and the neck 6a through which the aperture 5a is formed is located above and in vertical alignment with the center of the axle 1a. This variation is made because front axles are lower than rear axles, and in the manner above described provision is made for supporting the rod 14 adjacent the clamping member 2a at sufficient height for the jack 25 to operate beneath it. The spring 22 in this case is hooked into an opening 21a formed in the clamping member 2a. Otherwise the construction and operation of the device are exactly similar to that already described.

It will also be noted that in the event of the rear portion of the rod 14 contacting any obstruction it is free to move upwardly in which case the link 15 turns rearwardly above the flexed stud extremity 11a and in so doing compresses the spring 19. As soon as the obstruction is cleared the rod and link are returned to their normal position by the said spring 19.

While in the foregoing the preferred embodiments of the invention have been described and shown, it is understood that the construction is susceptible to such further alterations and modifications as fall within the scope of the appended claims.

What I claim as my invention and desire to secure by Letters Patent is:

1. A jack mounting arrangement comprising a clamping member adapted to be secured to an unsprung portion of a vehicle, a link pivotally mounted upon a sprung portion of a vehicle, a rod supported for axial movement by said member and carried at one extremity by said link, a jack having a vertically movable head, the latter being slidably mounted upon the rod, means on said member to stop the jack at its correct operating position adjacent the member, the lifting of the jack head raising said rod and through it the clamping member and unsprung portion, and means preventing axial movement of the rod in the member when the rod is raised.

2. A jack mounting arrangement comprising the combination set forth in claim 1 wherein the means preventing axial movement of the rod in the member when the jack is raised consists of transverse serrations formed across the rod upon its upper side and a tooth carried by the member to engage one of the serrations.

3. A jack mounting arrangement comprising the combination set forth in claim 1 wherein balanced springs tend to hold the rod against axial movement at all times.

4. A jack mounting arrangement comprising a clamping member adapted to be secured to an unsprung portion of a vehicle, a link pivotally mounted upon a sprung portion of the vehicle, a rod pivotally mounted upon the link and supported for axial movement by the member intermediately of its length, balanced springs tending to hold the rod against axial movement, a jack slidably mounted on the rod, and a yoke on said member to halt the jack at its operative position, the raising of the jack being adapted to lift said member and said unsprung portion.

5. A jack mounting arrangement comprising a clamping member secured to an axle of a vehicle, a link pivotally mounted upon a sprung portion of a vehicle, a rod supported for axial movement by said member and pivoted on said link, a jack having a vertically movable head, said head being slotted laterally from one side to engage said rod for sliding movement along the latter, and means on said member to stop the jack at its correct operating position, the jack being adapted to lift said member and axle through said rod.

6. In a jack mounting arrangement the combination set forth in claim 5 wherein means are provided on said jack head for preventing accidental disengagement of the latter from the rod.

7. In a jack mounting the combination of a rod, a clamping member secured to an axle of a vehicle, said member being apertured for the passage of the rod therethrough, a link pivoted upon a sprung portion of the vehicle, said rod being pivoted at one extremity upon said link, the rod being transversely serrated across its upper face, a tooth formed in the wall of the aperture to engage one of the serrations when the rod is lifted, a jack, and a vertically movable head thereon slidable along the rod the jack being adapted to lift the member and axle through said rod.

8. A jack mounting arrangement comprising a clamping member secured to one axle of a vehicle, a link pivoted upon a sprung portion of the vehicle, a rod one extremity of which is pivoted on said link, said clamping member also receiving said rod, a jack the head of which is slidably mounted upon said rod, and means limiting the travel of the jack in one direction adjacent said member whereby when the jack is raised the rod is turned about its pivot axis on said link and said member and axle are lifted through the rod.

9. A jack mounting arrangement comprising a clamping member secured to one axle of a vehicle, a link pivoted upon a sprung portion of the vehicle, a rod one extremity of which is pivoted on said link, said rod being supported for axial movement through said member, a jack the head of which is slidably mounted upon the rod, means limiting the travel of the jack upon the rod adjacent the clamping member rod support whereby when the jack head is raised the rod is turned about its pivot axis on the link and the member and axle are lifted through the rod, and means adapted to prevent movement of the rod through the member when the rod is raised.

10. A jack mounting comprising the combination set forth in claim 9, wherein balanced spring means tend to hold the rod at all times against axial movement.

JOHN LEITCH.